United States Patent
Wang et al.

(10) Patent No.: US 11,766,979 B2
(45) Date of Patent: Sep. 26, 2023

(54) SAFETY AIRBAG ASSEMBLY WITH CONNECTING MEMBER

(71) Applicant: Autoliv Development AB, Vargarda (SE)

(72) Inventors: Liang Wang, Shanghai (CN); Kan Wang, Shanghai (CN); Xiang Fei, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/597,182

(22) PCT Filed: Jun. 4, 2020

(86) PCT No.: PCT/CN2020/094330
§ 371 (c)(1),
(2) Date: Dec. 28, 2021

(87) PCT Pub. No.: WO2021/000692
PCT Pub. Date: Jan. 7, 2021

(65) Prior Publication Data
US 2022/0306032 A1    Sep. 29, 2022

(30) Foreign Application Priority Data

Jul. 1, 2019 (CN) .......................... 201910584256.4

(51) Int. Cl.
*B60R 21/20* (2011.01)
*B60R 21/232* (2011.01)

(52) U.S. Cl.
CPC ............ *B60R 21/20* (2013.01); *B60R 21/232* (2013.01)

(58) Field of Classification Search
CPC ..... B60R 21/20; B60R 21/201; B60R 21/213; B60R 21/232; B60R 21/18; B60R 21/207
See application file for complete search history.

(56) References Cited

U.S. PATENT DOCUMENTS 5,967,546 A * 10/1999 Homier ................. B60R 21/207
280/730.2
6,155,597 A * 12/2000 Bowers ............... B60R 21/2338
280/730.2

(Continued)

FOREIGN PATENT DOCUMENTS

CN         101108605 A     1/2008
CN         101573258 A     11/2009

(Continued)

OTHER PUBLICATIONS

First Office Action and Search Report of Chinese Application No. 201910584256.4, dated Apr. 13, 2023.

*Primary Examiner* — Laura Freedman
(74) *Attorney, Agent, or Firm* — DICKINSON WRIGHT PLLC (57) ABSTRACT

A safety airbag assembly having a safety airbag comprising a bag, and an elastic connection member for connecting the safety airbag to a body frame of a vehicle, wherein the bag is provided with a protruding sheet connected to the elastic connection member, the elastic connection member is configured to be in a curvilinear shape formed by connecting a plurality of sections end to end, and the plurality of sections of the elastic connection member comprise hook-like first ends, hook-like second ends, and middle portions located between the first ends and the second ends, with the middle portions being con-figured to be connected to the protruding sheet of the bag, and the first ends and the second ends being configured to suspend the bag connected to the middle portions on the body frame.

12 Claims, 6 Drawing Sheets

(56) References Cited

U.S. PATENT DOCUMENTS

| | | | | |
|---|---|---|---|---|
| 6,224,129 B1 * | 5/2001 | Cisternino | ............ | B60N 2/2806 |
| | | | | 280/801.1 |
| 6,412,810 B1 * | 7/2002 | Wipasuramonton | ........................ | |
| | | | | B60R 21/232 |
| | | | | 280/730.2 |
| 6,474,681 B2 * | 11/2002 | Peer | ...................... | B60R 21/232 |
| | | | | 280/730.2 |
| 6,851,702 B2 * | 2/2005 | Henderson | ............ | B60R 21/213 |
| | | | | 280/730.2 |
| 6,896,288 B2 * | 5/2005 | Tanaka | .................... | B60R 21/232 |
| | | | | 280/730.2 |
| 7,044,500 B2 * | 5/2006 | Kalandek | ............ | B60R 21/2338 |
| | | | | 280/730.2 |
| 7,097,200 B2 * | 8/2006 | Wold | .................... | B60R 21/213 |
| | | | | 280/730.2 |
| 7,172,212 B2 * | 2/2007 | Aoki | ...................... | B60R 21/213 |
| | | | | 280/730.2 |
| 7,216,891 B2 * | 5/2007 | Biglino | ................. | B60R 21/232 |
| | | | | 24/458 |
| 7,261,316 B1 | 8/2007 | Salmo et al. | | |
| 7,303,206 B2 * | 12/2007 | Kippschull | ............ | B60R 21/213 |
| | | | | 280/730.2 |
| 7,328,911 B2 * | 2/2008 | Chapman | .............. | B60R 21/217 |
| | | | | 280/730.2 |
| 7,523,958 B2 * | 4/2009 | Jang | ...................... | B60R 21/213 |
| | | | | 280/730.2 |
| 7,547,038 B2 * | 6/2009 | Coleman | ................ | B60R 21/213 |
| | | | | 248/225.11 |
| 7,571,927 B2 * | 8/2009 | Purvis | .................... | B60R 21/215 |
| | | | | 280/728.2 |
| 7,694,999 B2 * | 4/2010 | Siewiera | ................. | B60R 21/20 |
| | | | | 24/458 |
| 7,780,187 B2 * | 8/2010 | Minamikawa | ........ | B60R 21/213 |
| | | | | 24/458 |
| 7,815,216 B2 * | 10/2010 | Minamikawa | ........ | B60R 21/201 |
| | | | | 280/730.2 |
| 7,887,086 B2 * | 2/2011 | Kalandek | .............. | B60R 21/217 |
| | | | | 248/225.11 |
| 8,196,952 B2 * | 6/2012 | Walston | .............. | B60R 21/2171 |
| | | | | 280/730.2 |
| 8,220,825 B2 * | 7/2012 | Bonarens | .............. | B60R 21/213 |
| | | | | 280/728.2 |
| 8,434,782 B2 * | 5/2013 | Asano | .................... | B60R 21/213 |
| | | | | 296/210 |
| 8,505,961 B2 * | 8/2013 | Jakobsson | ............. | B60R 21/232 |
| | | | | 280/730.2 |
| 8,505,962 B2 * | 8/2013 | Henriksson | ............. | F16L 3/137 |
| | | | | 280/728.2 |
| 8,505,963 B1 | 8/2013 | Lewis et al. | | |
| 8,636,300 B2 * | 1/2014 | Jaconelli | ................ | B60R 21/213 |
| | | | | 280/730.2 |
| 9,487,175 B2 * | 11/2016 | Noma | .................... | B60R 21/214 |
| 9,925,944 B2 * | 3/2018 | Williams | ............... | B60R 21/217 |
| 9,981,625 B2 * | 5/2018 | Witt, Jr. | ................. | B60R 21/213 |
| 10,005,419 B2 * | 6/2018 | Konaka | .................. | B60R 21/237 |
| 10,322,692 B2 * | 6/2019 | Ma | ........................ | B60R 21/213 |
| 10,399,533 B2 * | 9/2019 | Yoshikai | .................. | B60N 2/58 |
| 10,843,655 B2 * | 11/2020 | Feller | .................. | B60R 21/2338 |
| 10,960,842 B2 * | 3/2021 | Shimizu | ................ | B60R 21/232 |
| 11,370,379 B2 * | 6/2022 | Abelenda Alcalde | ....................... | |
| | | | | B60R 21/232 |
| 2005/0029778 A1 * | 2/2005 | Weber | .................. | B60R 21/2338 |
| | | | | 280/730.2 |
| 2005/0046154 A1 * | 3/2005 | Rhea | ..................... | B60R 21/213 |
| | | | | 280/730.2 |
| 2007/0003390 A1 * | 1/2007 | Kawai | ................. | F16B 19/1081 |
| | | | | 411/48 |
| 2011/0175333 A1 | 7/2011 | Mitchell et al. | | |
| 2012/0056054 A1 * | 3/2012 | Glockler | ................. | B60R 21/20 |
| | | | | 29/525.08 |
| 2013/0221637 A1 | 8/2013 | Lewis et al. | | |
| 2014/0265264 A1 | 9/2014 | Low et al. | | |

FOREIGN PATENT DOCUMENTS

| | | | | |
|---|---|---|---|---|
| CN | 102369123 A | 3/2012 | | |
| CN | 103079904 A | 5/2013 | | |
| CN | 206171391 U | 5/2017 | | |
| DE | 102007007781 A1 * | 8/2008 | ......... | B60R 21/2338 |
| JP | 2002120686 A | 4/2002 | | |
| JP | 200458862 A | 2/2004 | | |
| JP | 2014184792 A | 10/2014 | | |
| JP | 2014189039 A * | 10/2014 | | |
| JP | 2014189255 A * | 10/2014 | | |
| KR | 10-2011-0029582 A | 3/2011 | | |
| KR | 10-2012-0041506 A | 5/2012 | | |

\* cited by examiner

SAFETY AIRBAG ASSEMBLY WITH CONNECTING MEMBER

TECHNICAL FIELD

The present invention relates to an automobile safety device, and in particular to a safety airbag assembly.

BACKGROUND

A safety airbag device is commonly used in a vehicle to protect a passenger in the vehicle from injury in an emergent situation. The safety airbag device includes a safety airbag and a gas generator. The safety airbag is generally in a stowed state, and is inflated only when the vehicle collides or is on impact. When the vehicle collides or is on impact, gas generated by the gas generator by means of explosion quickly inflates the safety airbag in the stowed state, and the inflated safety airbag expands to protect the passenger of the vehicle. The safety airbag device is fixedly connected to a vehicle body frame of the vehicle by means of a connecting member. The above connecting member in the prior art may include a stamped member for suspending the safety airbag from the vehicle body frame so as to perform pre-positioning operation and a bolt and nut assembly for fastening the safety airbag to the vehicle body frame. The stamped member formed by means of stamping is difficult to use in scenarios having different parameter requirements (such as size and shape). Therefore, the universality is poor, and it may be necessary to provide a variety of stamping dies to adapt to different use scenarios, thereby resulting in high costs. In addition, the stamped member formed by means of stamping is relatively heavy.

Therefore, a safety airbag assembly capable of being connected to a vehicle body frame of a vehicle in a universal, low-cost, and lightweight manner is desired.

SUMMARY

In order to solve the above technical problems, the present invention provides a safety airbag assembly, comprising:

a safety airbag, the safety airbag comprising an airbag; and an elastic connecting member, used to connect the safety airbag to a vehicle body frame of a vehicle;

wherein the airbag is provided with a lug for connection to the elastic connecting member, and the elastic connecting member is configured to be in the shape of a curved line formed by connecting a plurality of sections end to end in sequence, and the plurality of sections of the elastic connecting member comprise a hook-shaped first end, a hook-shaped second end, and an intermediate portion located between the first end and the second end, the intermediate portion being configured to be connected to the lug of the airbag, and the first end and the second end being configured to suspend the airbag connected to the intermediate portion from the vehicle body frame.

According to an embodiment of the present invention, an end of the lug goes around the intermediate portion, and then is fixed to the lug.

According to an embodiment of the present invention, the lug is provided with a material void portion; the material void portion is provided with a first group of positioning points A, B, C, and D; the intermediate portion is provided with a second group of positioning points A', B', C', and D', and when the intermediate portion is configured to be connected to the lug, the first group of positioning points correspond to the second group of positioning points in a one-to-one manner; in addition, the intermediate portion uses the second group of positioning points as demarcation points respectively and extends from a first side of the lug to a second side of the lug opposite the first side so as to prevent the lug from moving upwards, downwards, leftwards, or rightwards relative to the elastic connecting member.

According to an embodiment of the present invention, the material void portion is provided with holes at positions of the first group of positioning points respectively.

According to an embodiment of the present invention, the material void portion comprises an opening; the first group of positioning points are provided at the opening, and when the intermediate portion extends from the first side of the lug to the second side of the lug at the second group of positioning points respectively, the intermediate portion extends to be wider and/or higher than the opening on the first side or the second side of the lug.

According to an embodiment of the present invention, the opening is configured to be a rectangular opening.

According to an embodiment of the present invention, the opening is configured to be two elongated openings; the first group of positioning points are respectively provided at respective end points of the elongated openings, and when the intermediate portion extends from the first side of the lug to the second side of the lug at the second group of positioning points respectively, the intermediate portion extends to be wider than the elongated openings on the first side or the second side of the lug.

According to an embodiment of the present invention, the plurality of sections of the elastic connecting member are formed by bending a single wire-like material.

According to an embodiment of the present invention, the safety airbag is used as an airbag curtain.

According to an embodiment of the present invention, the lug is further provided with a bolt and nut assembly for connection to the vehicle body frame.

DETAILED DESCRIPTION

Specific embodiments of a safety airbag assembly according to the present invention will be described below with reference to the accompanying drawings. The following detailed description and the accompanying drawings are used to illustratively explain the principles of the present invention. The present invention is not limited to the described preferred embodiments, and the protection scope of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

A safety airbag assembly according to the present invention includes a safety airbag and an elastic connecting member. The elastic connecting member is used to connect the safety airbag to a vehicle body frame of a vehicle, and the safety airbag includes an airbag. The airbag is provided with a lug for connection to the elastic connecting member. Those skilled in the art could understand that the safety airbag in the safety airbag assembly according to the present invention may include an airbag curtain, a driver safety airbag, a passenger safety airbag, and the like.

The elastic connecting member in the safety airbag assembly according to the present invention will be described in detail below with reference to the accompanying drawings.

First Example

Figure 1:
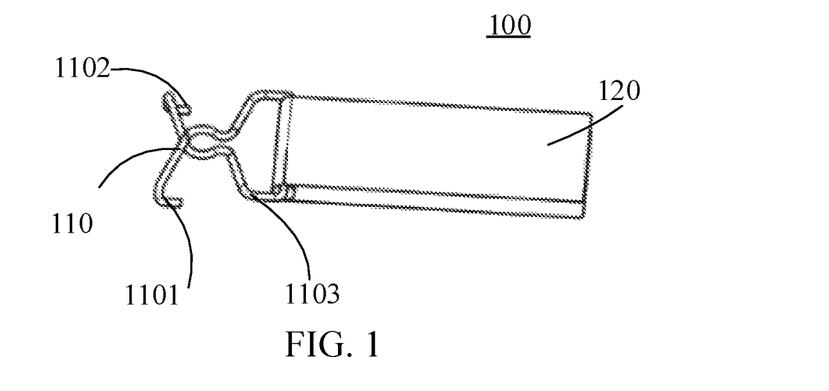
FIG. 1 shows a first example of an elastic connecting member in a safety airbag assembly according to the present invention.

FIG. 1 shows a first example of an elastic connecting member in a safety airbag assembly according to the present invention. The elastic connecting member in the safety airbag assembly according to the present invention will be described below with reference to FIG. 1.

As shown in FIG. 1, the safety airbag assembly 100 according to an embodiment of the present invention includes a safety airbag and an elastic connecting member 110. The safety airbag includes an airbag. The airbag is provided with a lug 120 for connection to the elastic connecting member 110. The elastic connecting member 110 is configured to be in the shape of a curved line formed by connecting a plurality of sections end to end in sequence, and the plurality of sections of the elastic connecting member 110 include a hook-shaped first end 1101, a hook-shaped second end 1102, and an intermediate portion 1103 located between the first end 1101 and the second end 1102. The intermediate portion 1103 is configured to be connected to the lug 120 of the airbag, and the first end 1101 and the second end 1102 are configured to suspend the airbag connected to the intermediate portion 1103 from a vehicle body frame (not shown).

In the first example shown in FIG. 1, an end of the lug 120 goes around the intermediate portion 1103 of the elastic connecting member 110, and then is fixed (for example, by means of stitching or bonding) to the lug 120. In addition, in order to prevent the elastic connecting member 110 from falling off the lug 120, a portion of the intermediate portion 1103 is designed to be narrower than the lug 120.

Second Example

Figure 2A:
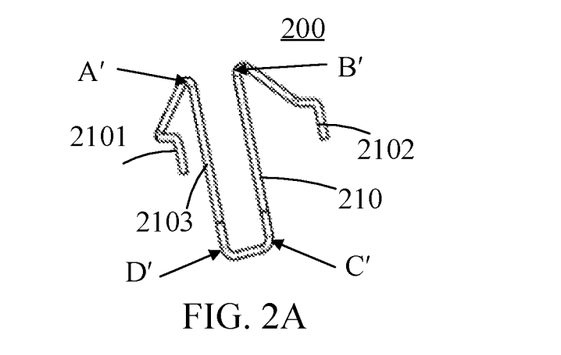
FIGS. 2A and 2B show a second example of an elastic connecting member in a safety airbag assembly according to the present invention.
Figure 2B:
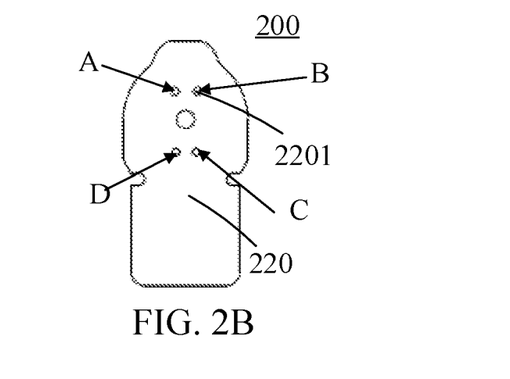

FIGS. 2A and 2B show a second example of an elastic connecting member in a safety airbag assembly according to the present invention. The elastic connecting member in the safety airbag assembly according to the present invention will be described below with reference to FIGS. 2A and 2B.

As shown in FIG. 2A and FIG. 2B, the safety airbag assembly 200 according to an embodiment of the present invention includes a safety airbag and an elastic connecting member 210. The safety airbag includes an airbag. The airbag is provided with a lug 220 for connection to the elastic connecting member 210. The elastic connecting member 210 is configured to be in the shape of a curved line formed by connecting a plurality of sections end to end in sequence, and the plurality of sections of the elastic connecting member 210 include a hook-shaped first end 2101, a hook-shaped second end 2102, and an intermediate portion 2103 located between the first end 2101 and the second end 2102. The intermediate portion 2103 is configured to be connected to the lug 220 of the airbag, and the first end 2101 and the second end 2102 are configured to suspend the airbag connected to the intermediate portion 2103 from a vehicle body frame (not shown).

As shown in FIG. 2B, the lug 220 is provided with a material void portion in the form of holes 2201. Four holes are provided with a first group of positioning points A, B, C, and D. The intermediate portion 2103 is provided with a second group of positioning points A', B', C', and D'. When the intermediate portion 2103 is configured to be connected to the lug 220, a left portion of the intermediate portion 2103 in FIG. 2A passes through two holes on the left of the lug 220 in FIG. 2B in sequence, and a right portion of the intermediate portion 2103 in FIG. 2A passes through two holes on the right of the lug 220 in FIG. 2B in sequence, so that the first group of positioning points correspond to the second group of positioning points in a one-to-one manner. That is, positioning point A corresponds to positioning point A'; positioning point B corresponds to positioning point B'; positioning point C corresponds to positioning point C' positioning point D corresponds to positioning point D'. In addition, C'D' section of the intermediate portion 2103 is arranged on an upper surface of the lug 220 in FIG. 2B; A'D' section and B'C' section of the intermediate portion 2103 are arranged on a lower surface of the lug 220 in FIG. 2B; a section from point A' to the first end 2101 and a section from point B' to the second end 2102 of the intermediate portion 2103 are located on the upper surface of the lug 220 in FIG. 2B. Therefore, the intermediate portion 2103 uses the second group of positioning points as demarcation points respectively and extends from a first side of the lug 220 to a second side of the lug 220 opposite the first side. In this way, a portion around points C and D and a portion around points A and B in the lug 220 respectively prevent upward movement and downward movement of the elastic connecting member 210, and a portion around points A and D and a portion around points B and C in the lug 220 respectively prevent rightward movement and leftward movement of the elastic connecting member 210, so that the lug 220 can be prevented from moving upwards, downwards, leftwards, or rightwards relative to the elastic connecting member 210.

In the second example shown in FIG. 2A and FIG. 2B, the section from point A' to the first end 2101 of the intermediate portion 2103 may extend in any direction, for example leftwards, rightwards, upwards, or downwards. The section from point B' to the second end 2102 in the intermediate portion 2103 may extend in any direction, for example leftwards, rightwards, upwards, or downwards.

Third Example

FIGS. 3A-3D show a third example of an elastic connecting member in a safety airbag assembly according to the present invention. The elastic connecting member in the safety airbag assembly according to the present invention will be described below with reference to FIGS. 3A-3D.

Figure 3A:
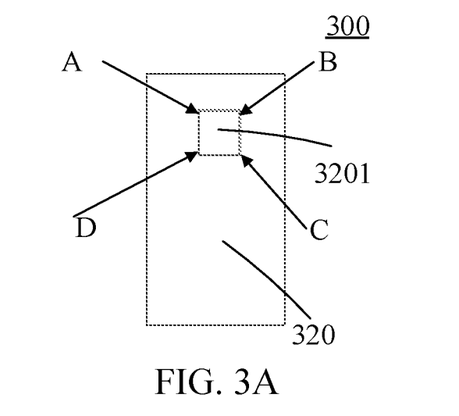
FIGS. 3A-3D show a third example of an elastic connecting member in a safety airbag assembly according to the present invention.
Figure 3B:
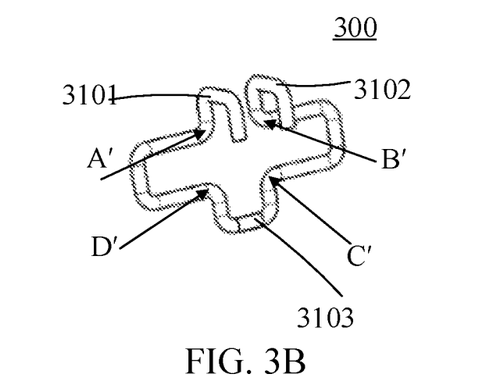
Figure 3C:
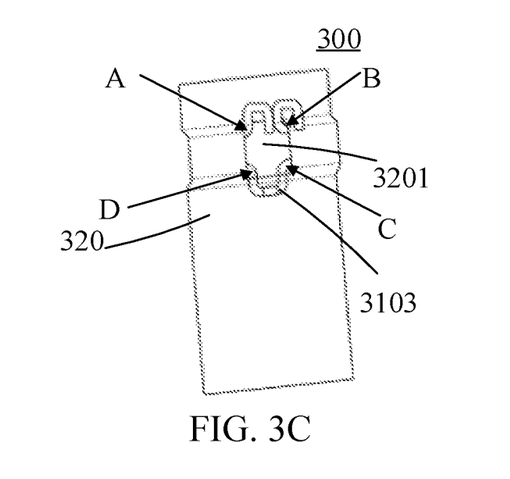
Figure 3D:
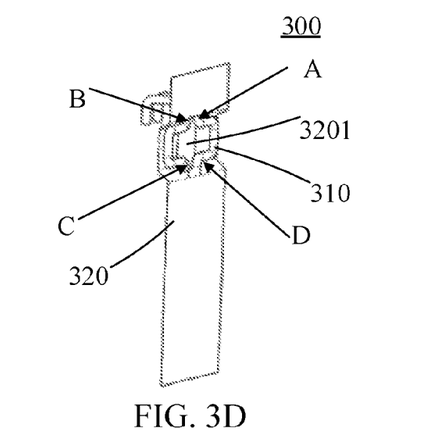

As shown in FIGS. 3A-3D, the safety airbag assembly 300 according to an embodiment of the present invention includes a safety airbag and an elastic connecting member 310 (FIG. 3D). The safety airbag includes an airbag. The airbag is provided with a lug 320 for connection to the elastic connecting member 310. The elastic connecting member 310 is configured to be in the shape of a curved line formed by connecting a plurality of sections end to end in sequence, and the plurality of sections of the elastic connecting member 310 include a hook-shaped first end 3101, a hook-shaped second end 3102, and an intermediate portion 3103 located between the first end 3101 and the second end 3102. The intermediate portion 3103 is configured to be connected to the lug 320 of the airbag, and the first end 3101 and the second end 3102 are configured to suspend the airbag connected to the intermediate portion 3103 from a vehicle body frame (not shown).

As shown in FIG. 3A and FIG. 3B, the lug 320 is provided with a material void portion in the form of a rectangular opening 3201. Four end points of the rectangular opening 3201 are provided with a first group of positioning points A, B, C, and D. The intermediate portion 2103 is provided with a second group of positioning points A', B', C', and D'. When the intermediate portion 3103 is configured to be connected to the lug 320, the intermediate portion 3103 in FIG. 3B extends into the rectangular opening 3201 of the lug 220 in FIG. 3A, and then extends out of the rectangular opening 3201, so that the first group of positioning points correspond to the second group of positioning points in a one-to-one manner. That is, positioning point A corresponds to positioning point A'; positioning point B corresponds to positioning point B'; positioning point C corresponds to positioning point C'; positioning point D corresponds to positioning point D'. In addition, C'D' section of the intermediate portion 3103 is arranged on an upper surface of the lug 320 in FIG. 3C; A'D' section and B'C' section of the intermediate portion 3103 are arranged on an upper surface of the lug 320 in FIG. 3D (namely a lower surface of the lug 320 in FIG. 3C); a section from point A' to the first end 3101 and a section from point B' to the second end 3102 of the intermediate portion 3103 are located on an upper surface of the lug 320 in FIG. 3B. Therefore, the intermediate portion 3103 uses the second group of positioning points as demarcation points respectively and extends from a first side of the lug 320 to a second side of the lug 320 opposite the first side. In addition, as shown in FIG. 3C, when the intermediate portion 3103 extends from the lower surface of the lug 320 to the upper surface of the lug 320 at positioning points A, B, C, and D respectively, on the upper surface of the lug 320 in FIG. 3C, the intermediate portion 3103 extends upwards at positioning point A and positioning point B beyond the rectangular opening 3201, and the intermediate portion 3103 extends downwards at positioning point C and positioning point D beyond the rectangular opening 3201, so that the intermediate portion 3103 extends to be higher than the rectangular opening 3201 on the upper surface of the lug 320 in FIG. 3C, the description "extending to be higher than the rectangular opening" should be understood as extending in height beyond an upper edge and a lower edge of the rectangular opening. In addition, as shown in FIG. 3D, on the upper surface of the lug 320 in FIG. 3D (namely the lower surface of the image 320 in FIG. 3C), the intermediate portion 3103 extends rightwards at positioning point A and positioning point D beyond the rectangular opening 3201, and the intermediate portion 3103 extends leftwards at positioning point B and positioning point C beyond the rectangular opening 3201, so that the intermediate portion 3103 extends to be wider than the rectangular opening 3201 on the upper surface of the lug 320 in FIG. 3D.

In this way, referring to FIG. 3C, a portion between points C and D and a portion between points A and B of the lug 320 respectively prevent downward movement and upward movement of the elastic connecting member 310, and a portion between points A and D and a portion between points B and C of the lug 320 respectively prevent leftward movement and right movement of the elastic connecting member 310, so that the lug 320 can be prevented from moving upwards, downwards, leftwards, or rightwards relative to the elastic connecting member 310.

Fourth Example

FIGS. 4A-4D show a fourth example of an elastic connecting member in a safety airbag assembly according to the present invention. The elastic connecting member in the safety airbag assembly according to the present invention will be described below with reference to FIGS. 4A-4D.

Figure 4A:
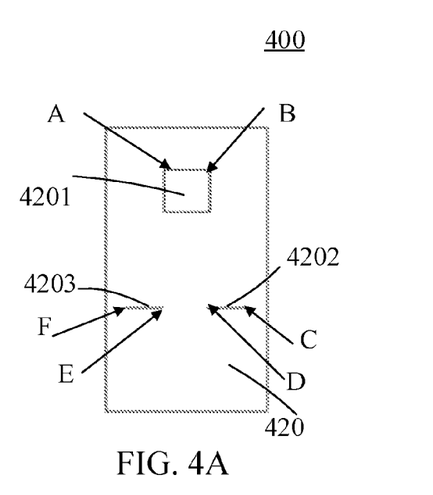
FIGS. 4A-4D show a fourth example of an elastic connecting member in a safety airbag assembly according to the present invention.
Figure 4B:
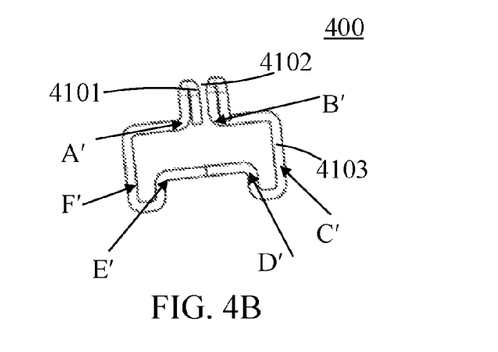
Figure 4C:
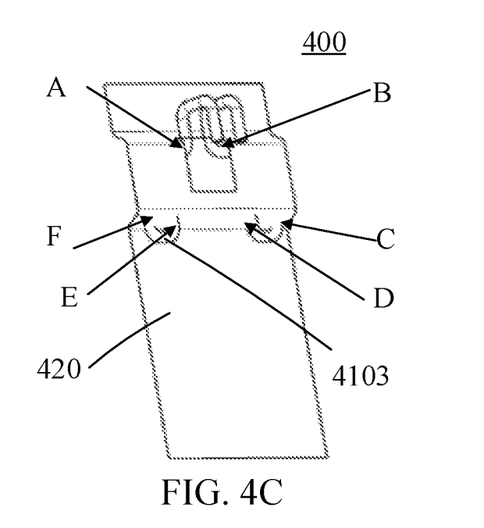
Figure 4D:
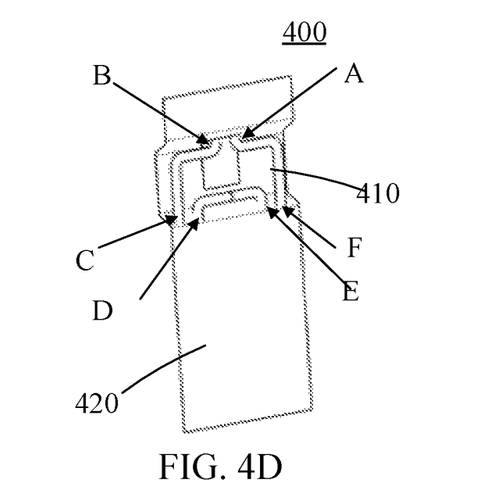

The fourth example shown in FIGS. 4A-4D is similar to the third example shown in FIGS. 3A-3D, and the differences between the two examples are described as follows. As shown in FIG. 4A and FIG. 4B, the lug 420 is provided with a material void portion in the form of one rectangular opening 4201 and two elongated openings 4202 and 4203. The rectangular opening 4201 and the elongated openings 4202 and 4203 are provided with a first group of positioning points A, B, C, D, E, and F. The intermediate portion 4103 is provided with a second group of positioning points A', B', C', D', E', and F'. Positioning points C' and F' can be understood as intersections of D'E' section of the intermediate portion 4103 extending to the left and to the right and the intermediate portion 4103. When the intermediate portion 4103 is configured to be connected to the lug 420, one portion of the intermediate portion 4103 in FIG. 4B extends into the rectangular opening 4201 of the lug 420 in FIG. 4A, and the other portion of the intermediate portion 4103 in FIG. 4B extends into the two elongated openings 4202 and 4203 of the lug 420 in FIG. 4A, so that the first group of positioning points correspond to the second group of positioning points in a one-to-one manner. That is, positioning point A corresponds to positioning point A'; positioning point B corresponds to positioning point B'; positioning point C corresponds to positioning point C'; positioning point D corresponds to positioning point D'. In addition, C'D' section and E'F' section of the intermediate portion 4103 are arranged on an upper surface of the lug 420 in FIG. 4C; E'D' section, F'A' section, and B'C' section of the intermediate portion 4103 are arranged on an upper surface of the lug 420 in FIG. 4D (namely a lower surface of the lug 420 in FIG. 4C); a section from point A' to the first end 4101 and a section from point B' to the second end 4102 in the intermediate portion 4103 are located on the upper surface of the lug 420 in FIG. 4C. Therefore, the intermediate portion 4103 uses the second group of positioning points as demarcation points respectively and extends from a first side of the lug 420 to a second side of the lug 420 opposite the first side. In addition, as shown in FIG. 4C, when the intermediate portion 4103 respectively extends, at the positioning points A, B, C, D, E, and F, from the lower surface of the lug 420 to the upper surface of the lug 420, on the upper surface of the lug 420 in FIG. 4C, the intermediate portion 4103 extends upwards at positioning point A and positioning point B beyond the rectangular opening 4201; the intermediate portion 4103 extends downwards at positioning point C and positioning point D beyond the elongated opening 4202; the intermediate portion 4103 extends downwards at positioning point E and positioning point F beyond the elongated opening 4203, so that the intermediate portion 4103 extends to be higher than the rectangular opening 4201, the elongated opening 4202, and the elongated opening 4203 on the upper surface of the lug 420 in FIG. 4C, the description "extending to be higher than the rectangular opening or the elongated openings" should be understood as extending in height beyond an upper edge and a lower edge of the corresponding opening. In addition, as shown in FIG. 4D, on the upper surface of the lug 420 in FIG. 4D (namely the lower surface of the image 420 in FIG. 4C), the intermediate portion 4103 extends rightwards at positioning point A beyond the rectangular opening 4201 and extends leftwards at positioning point B beyond the rectangular opening 4201, and the intermediate portion 4103 extends at positioning point D and positioning point E in opposite directions beyond the elongated openings 4202 and 4203, so that the intermediate portion 4103 extends to be wider than the rectangular opening 4201 and the elongated openings 4202 and 4203 on the upper surface of the lug 420 in FIG. 4D.

In this way, referring to FIG. 4C, a portion between point D and point E and a portion between point A and point B in the lug 420 respectively prevent downward movement and upward movement of the elastic connecting member 410, and a portion between point B and point C and a portion between point A and point F in the lug 420 respectively prevent rightward movement and leftward movement of the elastic connecting member 410, so that the lug 420 can be prevented from moving upwards, downwards, leftwards, or rightwards relative to the elastic connecting member 410.

Fifth Example

FIGS. 5A-5D show a fifth example of an elastic connecting member in a safety airbag assembly according to the present invention. The elastic connecting member in the safety airbag assembly according to the present invention will be described below with reference to FIGS. 5A-5D.

As shown in FIGS. 5A-5D, the safety airbag assembly 500 according to an embodiment of the present invention includes a safety airbag and an elastic connecting member 510. The safety airbag includes an airbag. The airbag is provided with a lug 520 for connection to the elastic connecting member 510. The elastic connecting member 510 is configured to be in the shape of a curved line formed by connecting a plurality of sections end to end in sequence, and the plurality of sections of the elastic connecting member 510 include a hook-shaped first end 5101, a hook-shaped second end 5102, and an intermediate portion 5103 located between the first end 5101 and the second end 5102. The intermediate portion 5103 is configured to be connected to the lug 520 of the airbag, and the first end 5101 and the second end 5102 are configured to suspend the airbag connected to the intermediate portion 5103 from a vehicle body frame (not shown).

Figure 5A:
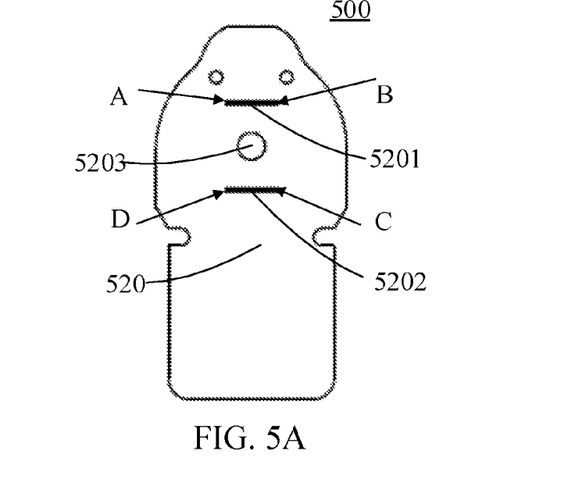
FIGS. 5A-5D show a fifth example of an elastic connecting member in a safety airbag assembly according to the present invention.
Figure 5B:
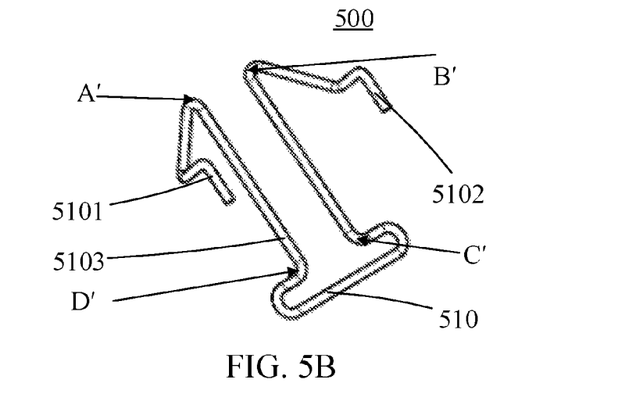

As shown in FIG. 5A, the lug 520 is provided with a material void portion in the form of two elongated openings 5201 and 5202. A first group of positioning points A, B, C, and D are respectively provided at respective end points of the elongated openings 5201 and 5202, and the intermediate portion 5103 is provided with a second group of positioning points A', B', C', and D'. When the intermediate portion 5103 is configured to be connected to the lug 520, the intermediate portion 5103 in FIG. 5B extends into the elongated opening 5201 of the lug 520 in FIG. 5A and extends out of the elongated opening 5202, so that the first group of positioning points correspond to the second group of positioning points in a one-to-one manner. That is, positioning point A corresponds to positioning point A'; positioning point B corresponds to positioning point B'; positioning point C corresponds to positioning point C'; positioning point D corresponds to positioning point D'. In addition, C'D' section of the intermediate portion 5103 is arranged on an upper surface of the lug 520 in FIG. 5C; A'D' section and B'C' section in the intermediate portion 5103 are arranged on an upper surface of the lug 520 in FIG. 5D (namely a lower surface of the lug 520 in FIG. 5C); a section from point A' to the first end 5101 and a section from point B' to the second end 5102 in the intermediate portion 5103 are located on the upper surface of the lug 520 in FIG. 5C. Therefore, the intermediate portion 5103 uses the second group of positioning points as demarcation points respectively and extends from a first side of the lug 520 to a second side of the lug 520 opposite the first side. In addition, as shown in FIG. 5C, when the intermediate portion 5103 extends, at positioning points A, B, C, and D respectively, from the lower surface of the lug 520 to the upper surface of the lug 520, on the upper surface of the lug 520 in FIG. 5C, the intermediate portion 5103 extends to the lower left at positioning point A and positioning point D respectively beyond the elongated opening 5201 and the elongated opening 5202, and the intermediate portion 5103 extends to the lower right at positioning point B and positioning point C respectively beyond the elongated opening 5201 and the elongated opening 5202, so that the intermediate portion 5103 extends to be wider than an opening 3201 on the upper surface of the lug 520 in FIG. 5C.

Figure 5C:
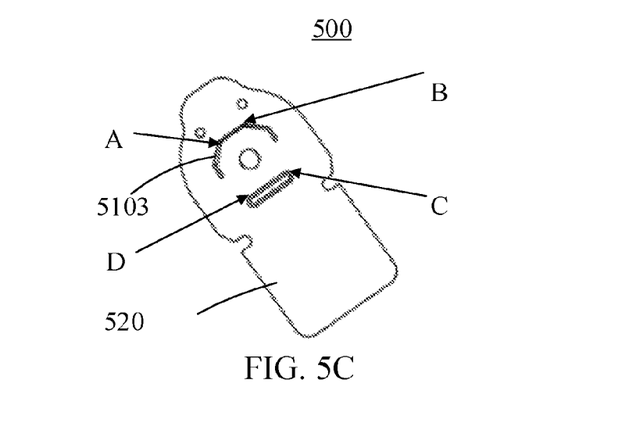
Figure 5D:
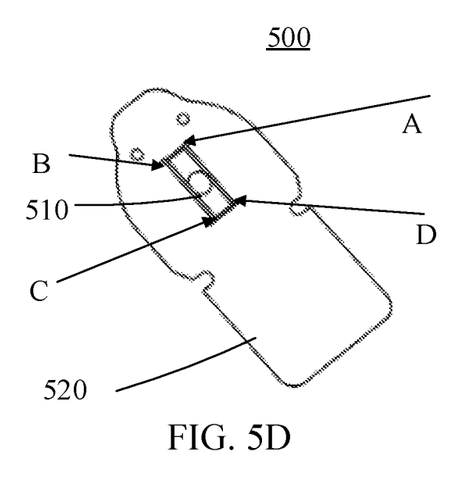

In this way, referring to FIG. 5C, a portion between points C and D and a portion between points A and B in the lug 520 respectively prevent upward movement and downward movement of the elastic connecting member 510, and a portion between points A and D and a portion between points B and C in the lug 520 respectively prevent leftward movement and right movement of the elastic connecting member 510, so that the lug 520 can be prevented from moving upwards, downwards, leftwards, or rightwards relative to the elastic connecting member 510.

In addition, referring back to FIG. 5A, the lug 520 is further provided with a through hole 5203. It could be easily conceived of a corresponding portion of the vehicle body frame being also provided with a through hole. A bolt can pass through the through hole 5203 on the lug 520 and the corresponding through hole on the vehicle body frame, and cooperate with a nut to fasten the lug 520 to the vehicle body frame. Those skilled in the art could understand that the bolt and nut assembly for fastening the airbag to the vehicle body frame could also be applied in the first example to the fourth example.

According to a preferred embodiment of the present invention, the plurality of sections (namely, the hook-shaped first end, the hook-shaped second end, and the intermediate portion between the first end and the second end) of the elastic connecting member in the above examples are formed by bending a single wire-like material. The wire-like material may be spring steel, and bending of the spring steel may be implemented by merely using a bending machine to directly perform machining. In the safety airbag assembly according to the present invention, the cross-sectional shape of the spring steel is not limited. However, those skilled in the art could understand that the above preferred embodiment is merely an example, and the safety airbag assembly according to the present invention is not limited thereto. For example, the plurality of sections of the elastic connecting member are not necessarily formed by bending a single wire-like material, and instead could be formed by welding the plurality of sections end to end in sequence. As another example, the wire-like material is not limited to the spring steel, and may be common steel. As another example, when the plurality of sections of the elastic connecting member are formed by bending a single wire-like material, a processing process is not limited to merely using a bending machine to directly perform machining, and may further include a heat treatment process.

Therefore, in the safety airbag assembly according to the present invention, the elastic connecting member is configured to be in the shape of a curved line formed by connecting a plurality of sections end to end in sequence. Therefore, the elastic connecting member may be formed by, for example, bending a single piece of spring steel or welding a plurality of sections end to end in sequence. Therefore, the elastic connecting member in the safety airbag assembly according to the present invention can be bent according to different described requirements, so as to be used in scenarios having different parameter requirements (such as size and shape), and thus has good universality and low processing costs, and is light. In addition, the intermediate portion of the elastic connecting member is configured to be connected to the lug of the airbag, and the first end and the second end are configured to suspend the airbag connected to the intermediate portion from the vehicle body frame. Therefore, the elastic connecting member has a simple and reliable connection method. Therefore, the safety airbag assembly according to the present invention can be connected to a vehicle body frame of a vehicle in a universal, low-cost, and lightweight manner.

As described above, although the exemplary embodiments of the present invention have been described with reference to the accompanying drawings in the description, the present invention is not limited to the aforementioned specific embodiments, and the protection scope of the present invention should be defined by the claims and equivalent meanings thereof.

The invention claimed is:

1. A safety airbag assembly for a vehicle having a vehicle body frame, the safety airbag assembly comprising:
   an airbag; and
   an elastic connecting member used to connect the airbag to the vehicle body frame,
   wherein the airbag is provided with a lug for connection to the elastic connecting member,
   wherein the elastic connecting member is configured to be in the shape of a curved line formed by connecting a plurality of sections end to end in sequence, and the plurality of sections of the elastic connecting member comprise a hook-shaped first end, a hook-shaped second end, and an intermediate portion located between the first end and the second end,
   wherein the intermediate portion is configured to be connected to the lug of the airbag such that an end of the lug goes around the intermediate portion and is fixed to the lug, and
   wherein the first end and the second end are crossed to each other and are configured to suspend the airbag connected to the intermediate portion of the elastic connecting member connected to the vehicle body frame.

2. The safety airbag assembly according to claim 1, wherein the plurality of sections of the elastic connecting member are formed by bending a single wire material.

3. The safety airbag assembly according to claim 2, wherein the airbag is used as an airbag curtain.

4. The safety airbag assembly according to claim 3, wherein the lug is further provided with a bolt and nut assembly for connection to the vehicle body frame.

5. A safety airbag assembly for a vehicle having a vehicle body frame, the safety airbag assembly comprising:
   an airbag; and
   an elastic connecting member used to connect the airbag to the vehicle body frame,
   wherein the airbag is provided with a lug for connecting to the elastic connecting member,
   wherein the elastic connecting member includes a hook-shaped first end, a hook-shaped second end, and an intermediate portion located between the first end and the second end,
   wherein the intermediate portion is configured to be connected to the lug of the airbag,
   wherein the first end and the second end are configured to suspend the airbag connected to the intermediate portion from the vehicle body frame,
   wherein the lug is provided with a material void portion provided with a first group of positioning points A, B, C, and D, and the intermediate portion is provided with a second group of positioning points A', B', C', and D',
   wherein when the intermediate portion is configured to be connected to the lug, the first group of positioning points correspond to the second group of positioning points in a one-to-one manner, and
   wherein the intermediate portion uses the second group of positioning points as demarcation points respectively and extends from a first side of the lug to a second side of the lug opposite the first side so as to prevent the lug from moving upwards, downwards, leftwards, or rightwards relative to the elastic connecting member.

6. The safety airbag assembly according to claim 5, wherein the material void portion is provided with holes at positions of the first group of positioning points respectively.

7. The safety airbag assembly according to claim 5, wherein the material void portion comprises an opening, the first group of positioning points are provided at the opening, and when the intermediate portion extends from the first side of the lug to the second side of the lug at the second group of positioning points respectively, the intermediate portion extends to be wider and/or higher than the opening on the first side or the second side of the lug.

8. The safety airbag assembly according to claim 7, wherein the opening is configured to be a rectangular opening.

9. The safety airbag assembly according to claim 7, wherein the opening is configured to be two elongated openings; the first group of positioning points are respectively provided at respective end points of the elongated openings, and when the intermediate portion extends from the first side of the lug to the second side of the lug at the second group of positioning points respectively, the intermediate portion extends to be wider than the elongated openings on the first side or the second side of the lug.

10. The safety airbag assembly according to claim 9, wherein the plurality of sections of the elastic connecting member are formed by bending a single wire material.

11. The safety airbag assembly according to claim 7, wherein the plurality of sections of the elastic connecting member are formed by bending a single wire material.

12. The safety airbag assembly according to claim 5, wherein the plurality of sections of the elastic connecting member are formed by bending a single wire material.

\* \* \* \* \*